(12) United States Patent
Li

(10) Patent No.: US 11,787,493 B1
(45) Date of Patent: Oct. 17, 2023

(54) BICYCLE LAMP EASY TO DISASSEMBLE AND REPLACE

(71) Applicant: Shenzhen Zhongkerui Electronics Co., Ltd., Shenzhen (CN)

(72) Inventor: Shaokun Li, Shenzhen (CN)

(*) Notice: Subject to any disclaimer, the term of this patent is extended or adjusted under 35 U.S.C. 154(b) by 0 days.

(21) Appl. No.: 18/193,011

(22) Filed: Mar. 30, 2023

(30) Foreign Application Priority Data

Jul. 26, 2022 (CN) .......................... 202221935728.X

(51) Int. Cl.
  *B62J 6/16* (2020.01)
  *F21V 23/04* (2006.01)
  *F21V 23/06* (2006.01)
  *F21W 107/13* (2018.01)

(52) U.S. Cl.
  CPC ................. *B62J 6/16* (2013.01); *F21V 23/04* (2013.01); *F21V 23/06* (2013.01); *F21W 2107/13* (2018.01)

(58) Field of Classification Search
  CPC .............. B62J 6/16; F21V 23/04; F21V 23/06
  See application file for complete search history.

(56) References Cited

U.S. PATENT DOCUMENTS

2015/0197299 A1* 7/2015 Lee ............................ B62J 6/04
  280/288.4

* cited by examiner

*Primary Examiner* — Thomas M Sember

(57) ABSTRACT

A bicycle lamp that is easy to disassemble and replace, wherein the bicycle lamp includes a top surface and a bottom surface; a detachable top surface base is arranged on the top surface, and a detachable bottom surface base is arranged under the bottom surface; the top surface base is configured to connect and fix bicycle equipment, and the bottom surface base is configured to connect and fix the bicycle lamp to an extension clip of a bicycle.

9 Claims, 4 Drawing Sheets

BICYCLE LAMP EASY TO DISASSEMBLE AND REPLACE

CROSS REFERENCE TO RELATED APPLICATIONS

The present application claims foreign priority of Chinese Patent Application No. 202221935728.X, filed on Jul. 26, 2022, in the China National Intellectual Property Administration, the entire contents of which are hereby incorporated by reference in its entirety.

TECHNICAL FIELD

The present disclosure relates to the technical field of bicycle lamps, in particular to a bicycle lamp easy to disassemble and replace.

BACKGROUND

As a kind of eco-friendly and convenient transportation, bicycle lamp is an indispensable travel equipment in people's daily life, and with the call of low-carbon society and people's concern for health, many people have started to ride bicycles again.

Patent No. CN202641937U discloses a bicycle lamp bracket set and a lamp dedicated to the bracket set, the bracket set includes a quick release part, and a lamp combination part arranged on the quick release part. The lamp combination part includes: a pair of oppositely positioned side walls, where the two side walls define a lamp holding space therebetween and the lamp holding space is arranged with a lamp; at least one stop arranged at the top of the two side walls, the two stops extending opposite each other for a predetermined length; and at least one insert at a wall of the lamp holding space, the insert positioning the lamp in the lamp holding space axially.

Patent No. CN208248367U discloses a multi-functional bicycle lamp, including a fixing seat clamped on a bicycle, a light mounted on an upper end of the fixing seat, and a rear cover assembly mounted on a rear end of the light; the rear cover assembly includes an elastic band and a rear cover, a lower end of the elastic band being glued to a lower end of the rear cover, and an upper end of the elastic band being removably connected to an upper end of the rear cover; an outer side of the rear cover is arranged with a slot, a tail of the light is arranged with a snapping tab, the snapping tab being stuck in the slot; a reflective sheet is arranged between the rear cover and the light.

The inventor found that the above-mentioned bicycle lamp can only simply play a lighting role, cannot be assembled with other bicycle equipment, such that bicycle lamps, cycling computers/bells, etc. cannot be installed on the bicycle at the same time, and there are problems such as inconvenient disassembly and assembly.

SUMMARY OF THE DISCLOSURE

The technical problem to be solved by the present disclosure is to provide a bicycle lamp with simple structure, easy to disassemble and replace. To solve the above technical problem, a technical solution adopted by the present disclosure is to provide a bicycle lamp that is easy to disassemble and replace, wherein the bicycle lamp 2 comprises a top surface 20 and a bottom surface 22; a detachable top surface base 21 is arranged on the top surface 20, and a detachable bottom surface base 24 is arranged under the bottom surface 22; the top surface base 21 is configured to connect and fix bicycle equipment, and the bottom surface base 24 is configured to connect and fix the bicycle lamp 2 to an extension clip of a bicycle.

In some embodiments, a groove is defined on a top surface of the bicycle lamp 2, and a plurality of mounting holes 201 and a plurality of support columns 202 are arranged in the groove for installing the top surface base 21.

In some embodiments, the bottom surface 22 is formed in one piece, and the bottom surface 22 is arranged with a plurality of hole positions 221 for installing the bottom surface base 24.

In some embodiments, the top surface base 21 defines a plurality of through holes 211 facing the plurality of mounting holes 201 in a one-to-one correspondence, the top surface base 21 is arranged with a rotating slot structure, and the plurality of through holes 211 and the plurality of mounting holes 201 are connected through fasteners 212, such that the top surface base 21 is detachably and fixedly arranged in the groove of the top surface 20.

In some embodiments, the bottom surface base 24 defines a plurality of threaded through holes 241 facing the plurality of hole positions 221 in a one-to-one correspondence, the bottom surface base 24 is connected to the bottom surface 22 by screws 242, and a side of the bottom surface base 24 is arranged with a rotating slot structure.

In some embodiments, the bicycle lamp 2 comprises a housing that defines an accommodating space, and the top surface 20, the bottom surface 22, a lens 26, a top surface support plate 25, a circuit board 27, and a power supply 28 are arranged in the housing; the circuit board 27 is electrically connected to the power supply 28.

In some embodiments, a side wall of the bottom surface 22 is arranged with a USB/Type-C charging port and a button switch for charging a battery and changing a working mode of the lamp.

In some embodiments, the side wall of the bottom surface 22 is further arranged with a silicone plug 29, configured for waterproof and dustproof of the USB/Type-C charging port and the button switch.

Beneficial effects of the present disclosure: 1. by arranged the top base and the bottom base on the top and bottom of the bicycle lamp, the bicycle lamp, cycling computer/bell, and other equipment can be installed on the bicycle frame at the same time, saving installation space; 2. the bicycle equipment such as bicycle lamps, cycling computers/bells can be assembled at any time, and the disassembly and replacement of equipment are very convenient and fast, saving time; 3. the present disclosure has a simplified structure and is suitable for all bicycle equipment.

REFERENCE NUMERALS

Figure 1:
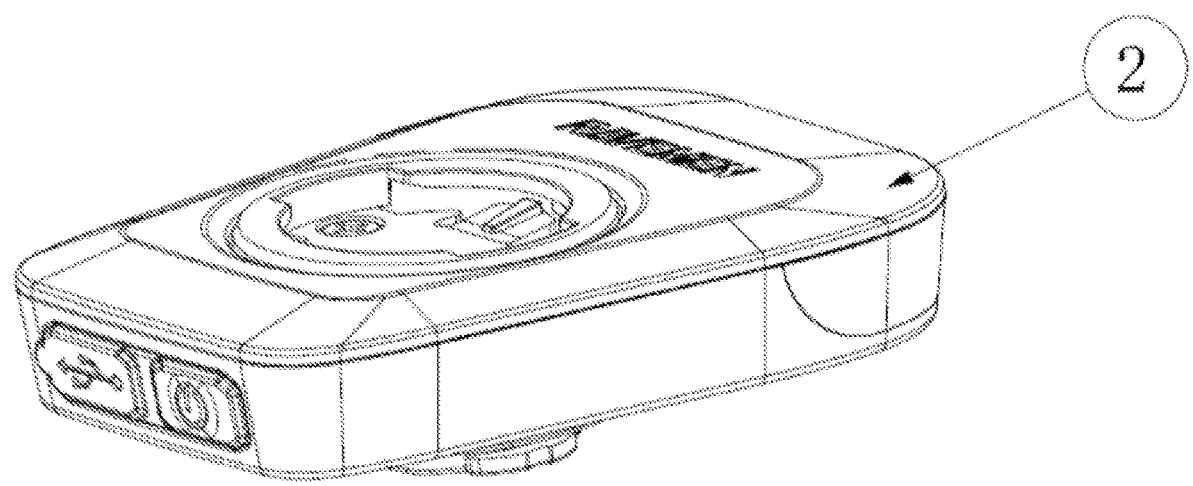
FIG. 1 is an overall schematic view of a bicycle lamp that is easy to disassemble and replace according to an embodiment of the present disclosure.

1. Bicycle; 2. bicycle lamp; 3. bicycle equipment 10. extension clip; 20. top surface; 21. top surface base; 22.

bottom surface; 24. bottom surface base; 201. mounting hole; 202. support column; 211. through hole; 212. fastener; 221. hole position; 241, threaded through hole; 242, screw; 25, top support plate; 26, lens; 27, circuit board; 28, power supply; 29, silicone plug.

DETAILED DESCRIPTION

The embodiment shown in FIGS. 1-4 is a bicycle lamp that is easy to disassemble and replace. The bicycle lamp 2 includes a top surface 20 and a bottom surface 22; a detachable top surface base 21 is arranged on the top surface 20, and a detachable bottom surface base 24 is arranged under the bottom surface 22; the top surface base 21 is configured to connect and fix other bicycle equipment 3, and the bottom surface base 24 is configured to connect and fix the bicycle lamp 2 to an extension clip 10 of a bicycle 1.

Figure 2:
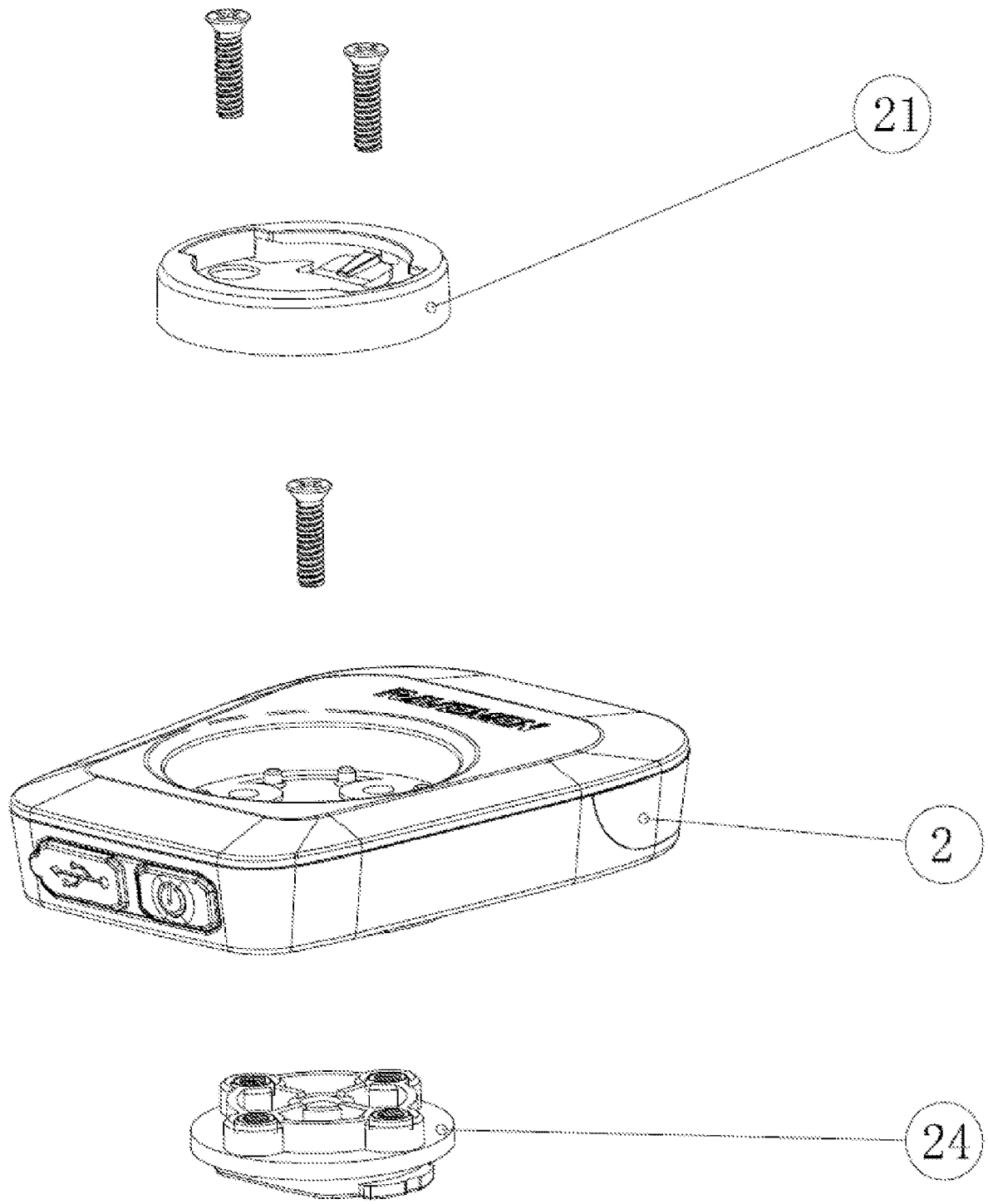
FIG. 2 is a schematic view of a split assembly of a bicycle lamp that is easy to disassemble and replace according to an embodiment of the present disclosure.
Figure 3:
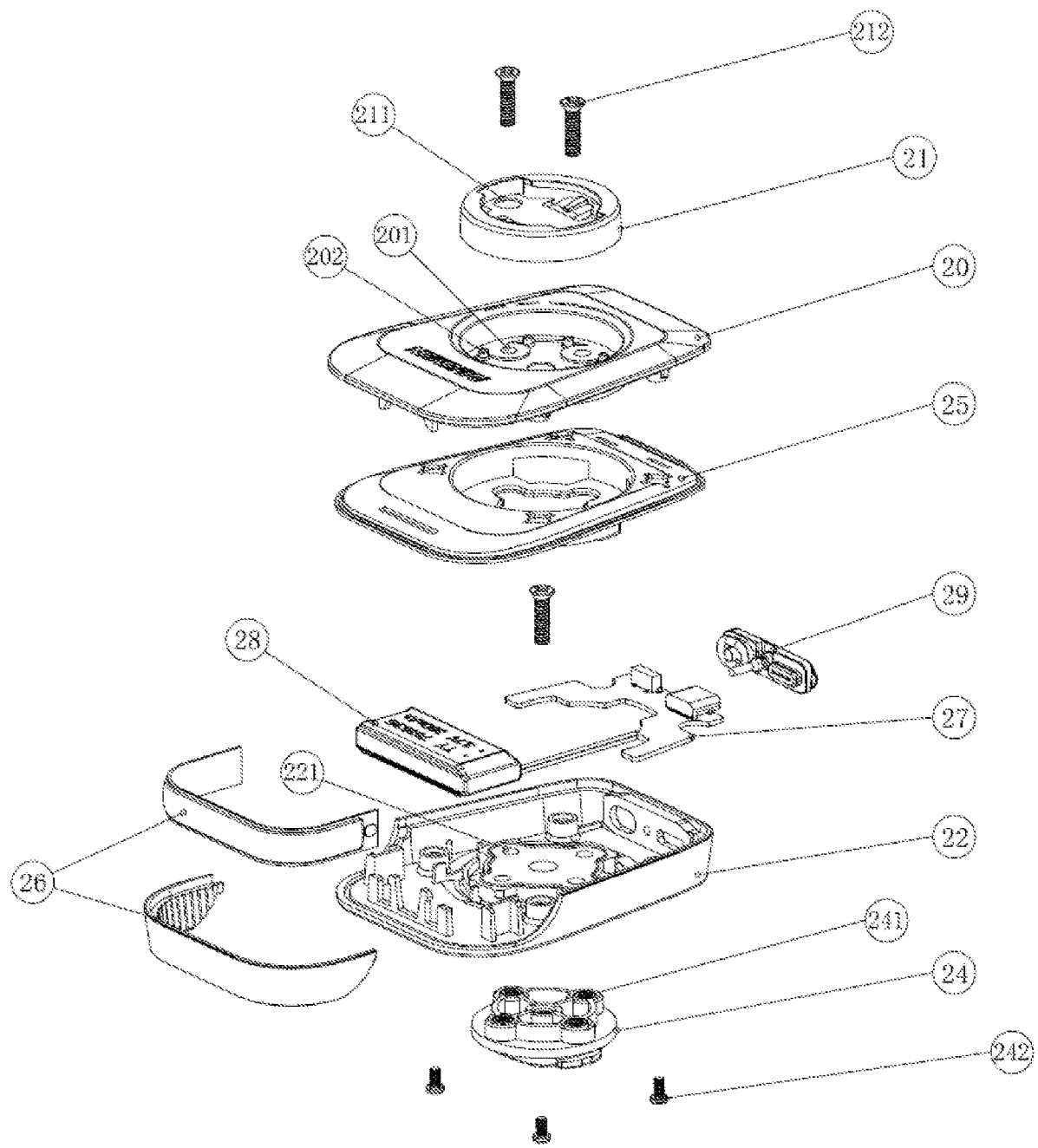
FIG. 3 is an exploded view of a bicycle lamp that is easy to disassemble and replace according to an embodiment of the present disclosure.
Figure 4:
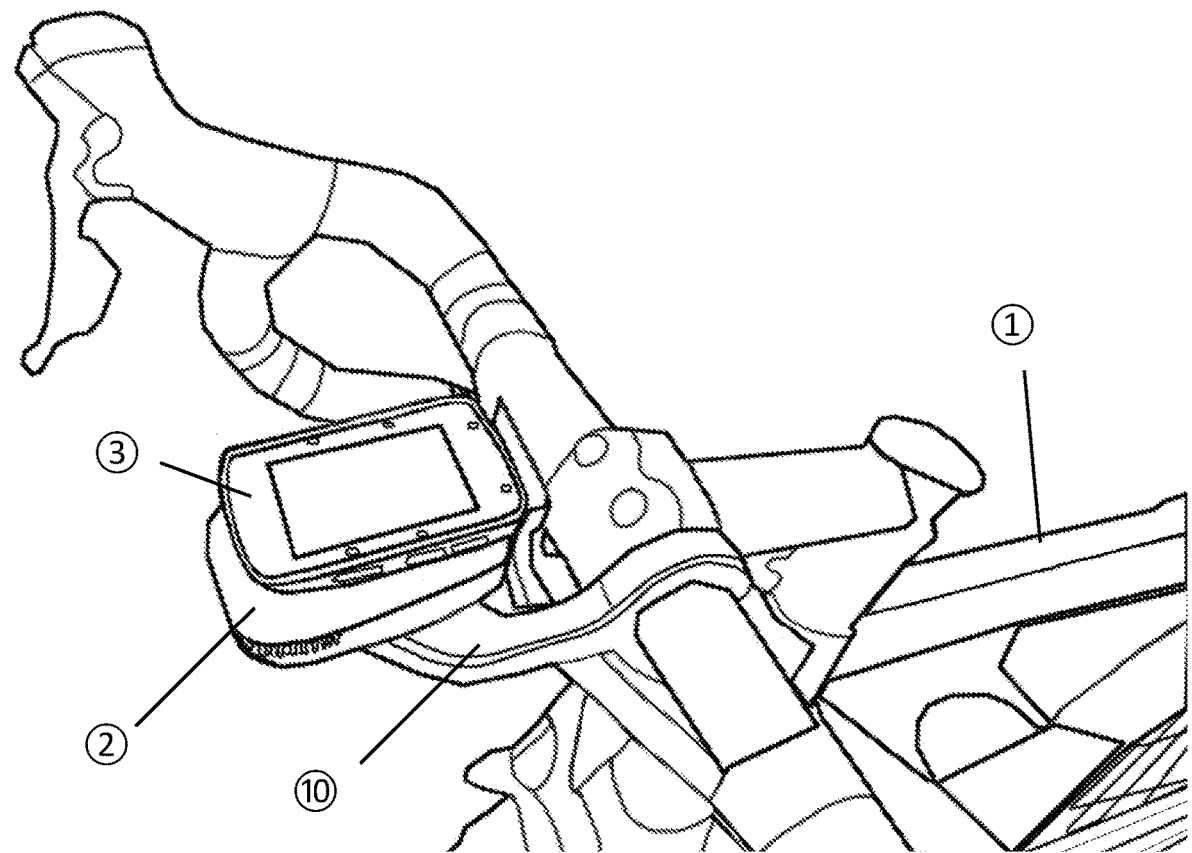
FIG. 4 is a schematic view showing the bicycle lamp being connected to a bicycle equipment as well as an extension clip of a bicycle.

As shown in FIGS. 1-3, a groove is defined on a top surface of the bicycle lamp 2, and multiple mounting holes 201 and multiple support columns 202 are arranged in the groove for installing the top surface base 21.

The bottom surface 22 is formed in one piece, and the bottom surface 22 is arranged with multiple hole positions 221 for installing the bottom surface base 24.

The top surface base 21 defines multiple through holes 211 facing the mounting holes 201 in a one-to-one correspondence, the top surface base 21 is arranged with a rotating slot structure, and the through holes 211 and the mounting holes 201 are connected through fasteners 212, such that the top surface base 21 can be detachably and fixedly arranged in the groove of the top surface 20. In a working state, the rotating slot structure of the top surface base 21 is coupled with end faces of different products, and the top surface base 21 is rotated by 30-90 degrees, such that the rotating slot structure can be in rotation buckle connection with different products; in a non-working state, the top surface base 21 is reversely rotated by 30-90 degrees, and the rotation buckle connection is released.

The bottom surface base 24 defines multiple threaded through holes 241 facing the hole positions 221 in a one-to-one correspondence, the bottom surface base 24 is connected to the bottom surface 22 by screws 242, and a side of the bottom surface base 24 is arranged with a rotating slot structure. In the working state, the bottom surface base 24 is rotated by 30-90 degrees to be in rotation buckle connection with other different products; in the non-working state, the bottom surface base 24 is reversely rotated by 30-90 degrees to release the rotation buckle connection.

The bicycle lamp 2 includes a housing that defines an accommodating space, and the top surface 20, the bottom surface 22, a lens 26, a top surface support plate 25, a circuit board 27, and a power supply 28 are arranged in the housing; the circuit board 27 is electrically connected to the power supply 28.

A side wall of the bottom surface 22 is arranged with a USB/Type-C charging port and a button switch for charging a battery and changing a working mode of the lamp.

The side wall of the bottom surface 22 is further arranged with a silicone plug 29, which is configured for waterproof and dustproof of the USB/Type-C charging port and the button switch.

The above-mentioned embodiments are only preferred embodiments of the present disclosure, and is not intended to limit the implementation and claimed scope of the present disclosure. All equivalent variations and modifications based on the scope described in the present disclosure shall be included in the scope of the present disclosure.

What is claimed is:

1. A bicycle lamp that is easy to disassemble and replace, wherein the bicycle lamp comprises a top surface and a bottom surface; a detachable top surface base is arranged on the top surface, and a detachable bottom surface base is arranged under the bottom surface; the top surface base is configured to connect and fix bicycle equipment, and the bottom surface base is configured to connect and fix the bicycle lamp to an extension clip of a bicycle;
   a groove is defined on a top surface of the bicycle lamp, and a plurality of mounting holes and a plurality of support columns are arranged in the groove for installing the top surface base;
   the top surface base defines a plurality of through holes facing the plurality of mounting holes in a one-to-one correspondence, the top surface base is arranged with a rotating slot structure, and the plurality of through holes and the plurality of mounting holes are connected through fasteners, such that the top surface base is detachably and fixedly arranged in the groove of the top surface.

2. The bicycle lamp according to claim 1, wherein the bottom surface is formed in one piece, and the bottom surface is arranged with a plurality of hole positions for installing the bottom surface base.

3. The bicycle lamp according to claim 2, wherein the bottom surface base defines a plurality of threaded through holes facing the plurality of hole positions in a one-to-one correspondence, the bottom surface base is connected to the bottom surface by screws, and a side of the bottom surface base is arranged with a rotating slot structure.

4. The bicycle lamp according to claim 3, wherein the bicycle lamp comprises a housing that defines an accommodating space, and the top surface, the bottom surface, a lens, a top surface support plate, a circuit board, and a power supply are arranged in the housing; the circuit board is electrically connected to the power supply.

5. The bicycle lamp according to claim 4, wherein a side wall of the bottom surface is arranged with a USB/Type-C charging port and a button switch for charging a battery and changing a working mode of the lamp.

6. The bicycle lamp according to claim 5, wherein the side wall of the bottom surface is further arranged with a silicone plug, configured for waterproof and dustproof of the USB/Type-C charging port and the button switch.

7. The bicycle lamp according to claim 1, wherein the bicycle lamp comprises a housing that defines an accommodating space, and the top surface, the bottom surface, a lens, a top surface support plate, a circuit board, and a power supply are arranged in the housing; the circuit board is electrically connected to the power supply.

8. The bicycle lamp according to claim 7, wherein a side wall of the bottom surface is arranged with a USB/Type-C charging port and a button switch for charging a battery and changing a working mode of the lamp.

9. The bicycle lamp according to claim 8, wherein the side wall of the bottom surface is further arranged with a silicone plug, configured for waterproof and dustproof of the USB/Type-C charging port and the button switch.

\* \* \* \* \*